US009529841B1

(12) United States Patent
Girdwood et al.

(10) Patent No.: US 9,529,841 B1
(45) Date of Patent: Dec. 27, 2016

(54) METHODS AND SYSTEMS FOR ELECTRONICALLY VISUALIZING A LIFE HISTORY

(71) Applicant: Christopher Girdwood, Gainesville, VA (US)

(72) Inventors: Christopher Girdwood, Gainesville, VA (US); David Girdwood, San Francisco, CA (US)

(73) Assignee: Christopher James Girdwood, Gainesville, VA (US)

( * ) Notice: Subject to any disclaimer, the term of this patent is extended or adjusted under 35 U.S.C. 154(b) by 253 days.

(21) Appl. No.: 14/478,743

(22) Filed: Sep. 5, 2014

Related U.S. Application Data

(60) Provisional application No. 61/874,526, filed on Sep. 6, 2013.

(51) Int. Cl.
*G06F 17/30* (2006.01)
*H04L 29/06* (2006.01)
*G06F 17/21* (2006.01)

(52) U.S. Cl.
CPC ....... *G06F 17/30386* (2013.01); *G06F 17/212* (2013.01); *H04L 67/42* (2013.01)

(58) Field of Classification Search
CPC ... G06F 17/30386; G06F 17/212; H04L 67/42
See application file for complete search history.

(56) References Cited

U.S. PATENT DOCUMENTS

| 4,613,946 | A |  | 9/1986 | Forman |  |
|---|---|---|---|---|---|
| 5,621,905 | A |  | 4/1997 | Jewson et al. |  |
| 5,995,728 | A |  | 11/1999 | Forman |  |
| 6,340,978 | B1 |  | 1/2002 | Mindrum |  |
| 6,443,734 | B1 |  | 9/2002 | Rappaport |  |
| 6,769,915 | B2 | * | 8/2004 | Murgia | G09B 19/00 434/127 |
| 6,850,891 | B1 | * | 2/2005 | Forman | G06Q 10/063 705/7.11 |
| 6,971,881 | B2 |  | 12/2005 | Reynolds |  |
| 7,143,084 | B1 | * | 11/2006 | Rinearson | G06Q 30/02 |
| 7,337,172 | B2 |  | 2/2008 | Shapiro |  |
| 7,874,841 | B1 |  | 1/2011 | Lycas |  |
| 8,103,947 | B2 |  | 1/2012 | Lunt et al. |  |
| 8,332,767 | B1 | * | 12/2012 | Beil | G06F 3/048 715/230 |
| 8,690,578 | B1 | * | 4/2014 | Nusbaum | G09B 19/00 128/905 |
| 8,726,142 | B2 | * | 5/2014 | Piantino | G06Q 50/01 707/728 |

(Continued)

OTHER PUBLICATIONS

MathWorks, "stairs", Sep. 25, 2012, p. 1-2.*

*Primary Examiner* — Albert Phillips, III
*Assistant Examiner* — Alp Onat
(74) *Attorney, Agent, or Firm* — David L. Hoffman; Hoffman Patent Group

(57) ABSTRACT

In an embodiment, a method of electronically visualizing a life history includes, using a processor, generating a first visual representation of a first life history as a function of a first set of multiple events that are defined by event data stored in a tangible storage medium. Each event is identified within the event data as being one of a positive life event and a negative life event. Within the event data, each event is associated with an age within the first life history.

8 Claims, 15 Drawing Sheets

(56) References Cited

U.S. PATENT DOCUMENTS

| | | | |
|---|---|---|---|
| 2002/0002558 A1* | 1/2002 | Krause | G06Q 30/02 |
| 2007/0250479 A1 | 10/2007 | Lunt et al. | |
| 2007/0261071 A1 | 11/2007 | Lunt et al. | |
| 2008/0147640 A1* | 6/2008 | Schachter | G06F 17/30867 |
| 2008/0244453 A1* | 10/2008 | Cafer | G06F 3/04817 |
| | | | 715/835 |
| 2008/0294663 A1* | 11/2008 | Heinley | G06F 3/0481 |
| 2009/0210793 A1* | 8/2009 | Yee | G06F 17/30265 |
| | | | 715/723 |
| 2010/0205179 A1* | 8/2010 | Carson | G06F 17/30867 |
| | | | 707/740 |
| 2011/0145327 A1* | 6/2011 | Stewart | G06F 17/3002 |
| | | | 709/203 |
| 2012/0005209 A1* | 1/2012 | Rinearson | G06F 17/30908 |
| | | | 707/737 |
| 2012/0115116 A1* | 5/2012 | Kronik | G09B 19/00 |
| | | | 434/236 |
| 2012/0266081 A1* | 10/2012 | Kao | G06Q 50/01 |
| | | | 715/751 |
| 2012/0326873 A1* | 12/2012 | Utter, II | G06F 3/016 |
| | | | 340/573.1 |
| 2013/0080427 A1* | 3/2013 | Cross | G06F 17/30648 |
| | | | 707/728 |
| 2013/0086641 A1* | 4/2013 | Mehr | G06F 21/552 |
| | | | 726/4 |
| 2013/0173531 A1* | 7/2013 | Rinearson | G06F 17/30011 |
| | | | 707/608 |
| 2013/0185315 A1* | 7/2013 | Hao | G06F 17/3053 |
| | | | 707/751 |
| 2014/0085077 A1* | 3/2014 | Luna | G08B 6/00 |
| | | | 340/539.11 |
| 2015/0052482 A1* | 2/2015 | Hontz, Jr. | G06F 17/30994 |
| | | | 715/817 |

\* cited by examiner

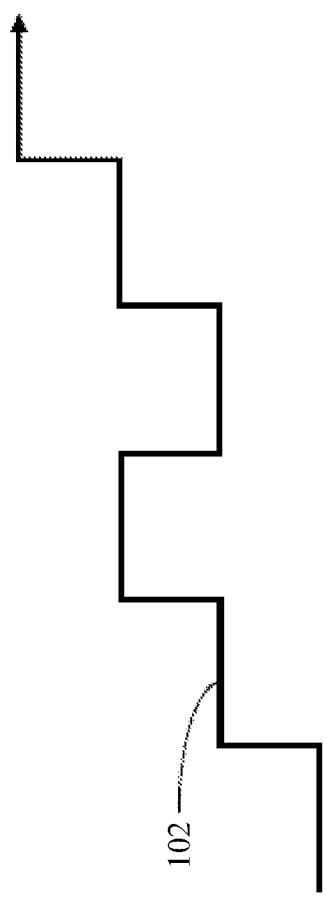

| Knowledge | Relationships | Labor | Recognition | Leisure | Me |
|---|---|---|---|---|---|
| Family | Friendship | Health | Historic Event | Travel | Unparalleled Event |
| Education | Romance | Employment | Politics | Music | |
| Religion | Marriage | Automobile | Membership | Writing | |
| Mentors | Children | Relocation | Promotion | Arts | |
| Books | Grandchildren | Real Estate | Award | Sports | |
| Self Development | Death | War | Public Speaking | Hobby | |

FIG. 2

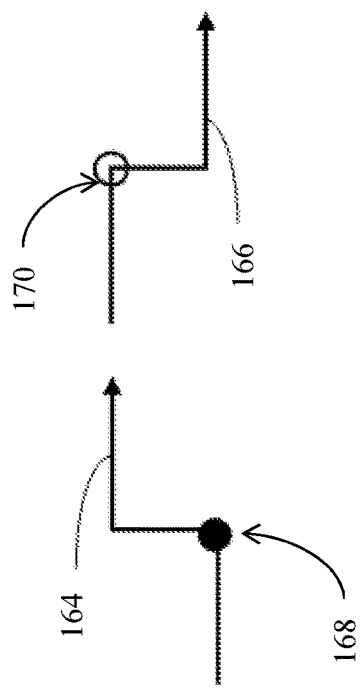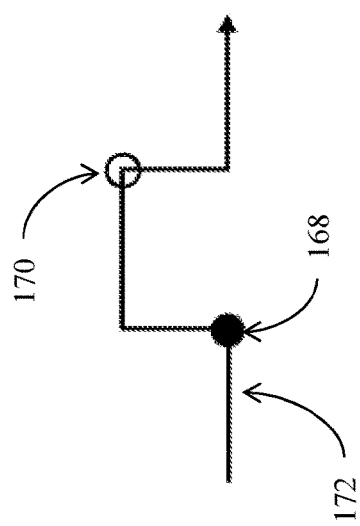
FIG. 10A
FIG. 10B

METHODS AND SYSTEMS FOR ELECTRONICALLY VISUALIZING A LIFE HISTORY

CROSS REFERENCE TO RELATED APPLICATION

This application claims the benefit of U.S. Provisional Application Ser. No. 61/874,526, filed on Sep. 6, 2013, the entirety of which is incorporated herein by reference.

BACKGROUND

Technical Field

This invention relates to life histories, and more particularly to methods and systems for electronically visualizing a life history.

Description of the Related Art

Conventional methods of creating a life history may rely primarily on descriptive text, or on multiple photographs. Such conventional methods may provide a way of describing a person's life in great detail, but may make it difficult to extrapolate information about a person's life. This in turn may make it even more difficult to interpret the extrapolated information to find trends, themes, and significant moments in a person's life. These difficulties may also make it more difficult to draw comparisons between two or more people, to find similarities and contrasts based on a person's life history.

Accordingly, improvements may be made over such conventional systems.

SUMMARY

In an aspect, a method of electronically visualizing a life history includes, using a processor, generating a first visual representation of a first life history as a function of a first set of multiple events that are defined by event data stored in a tangible storage medium. Each event is identified within the event data as being one of a positive life event and a negative life event, and, within the event data, each event is associated with an age within the first life history.

The method may include, using a display, displaying the first visual representation. Each event may be shown in the first visual representation as a visual element, the visual element being one of a first image that corresponds to a positive life event and a second image that corresponds to a negative life event. The first visual representation is generated by attaching each visual element to form a larger image.

The first image may be composed of a horizontal segment that extends horizontally and a vertical segment that extends upward, and the second image may be composed of a horizontal segment and a vertical segment that extends downward. Each event may be associated with a major factor in the event data.

The method may further include, using the processor, identifying a similarity between a second event of a second life history and a first event of the first life history based on a match for at least one of an event category, an event type, and an event name. The similarity may be further identified as a function of a first age when the first event occurred in the first life history and a second age when the second event occurred in the second life history.

The method may further include assigning a comparison score to the second life history based on the difference between the first age and the second age. The method may further include, using the processor, displaying a first simplified history of the first visual representation of the first life history with a second simplified history of a second visual representation of a second life history.

The method may further include, using a third image, connecting the first simplified history and the second simplified history at locations representing the same ages in the first life history and the second life history. The method may further include, using a fourth image, connecting the first simplified history and the second simplified history at locations representing similar ages in the first life history and the second life history.

The method may further include, responsive to a user selection of a chosen criteria, defining the function such that each event in the first visual representation is associated in the user data with the chosen criteria. The chosen criteria may include at least one of an event category, an event type, an event name, a major factor, and a minor factor.

The method may further include receiving a user text entry defining a name of a major factor, and using the processor, sorting the major factors by frequency of appearance. The method may further include, responsive to a user identification of a subsequent event, displaying a selectable option from the sorted list of major factors.

In another aspect, a computer-readable medium includes instructions that, when executed by a computer processor, cause the computer processor to perform the operations of generating a first visual representation of a first life history as a function of a first set of multiple events that are defined by event data stored in a tangible storage medium. Each event is identified within the event data as being one of a positive life event and a negative life event, and within the event data, each event is associated with an age within the first life history.

The computer-readable medium of claim may further include instructions that, when executed by the computer processor, cause the computer processor to perform the operations of using a display, displaying the first visual representation. When the instructions are executed by the computer processor, each event may be shown in the first visual representation as a visual element, the visual element being one of a first image that corresponds to a positive life event and a second image that corresponds to a negative life event.

When the instructions are executed by the computer processor, the first visual representation may be generated by attaching each visual element to form a larger image. When the instructions are executed by the computer processor, the first image may be composed of a horizontal segment that extends horizontally and a vertical segment that extends upward, and the second image may be composed of a horizontal segment and a vertical segment that extends downward.

The computer-readable medium of claim may further include instructions that, when executed by the computer processor, cause the computer processor to perform the operations of identifying a similarity between a second event of a second life history and a first event of the first life history based on a match for at least one of an event category, an event type, and an event name. The similarity may be further identified as a function of a first age when the first event occurred in the first life history and a second age when the second event occurred in the second life history. The processor may further perform the operations of assigning a comparison score to the second life history based on the difference between the first age and the second age.

BRIEF DESCRIPTION OF THE DRAWINGS

FIG. 1 is an illustration of a visualization of a life history, according to an embodiment;

FIG. 2 is an illustration of event categories and types, according to an embodiment;

FIGS. 10A-10B are an illustration of tagging events, according to an embodiment;

DESCRIPTION OF EXEMPLARY EMBODIMENTS

Figure 3:
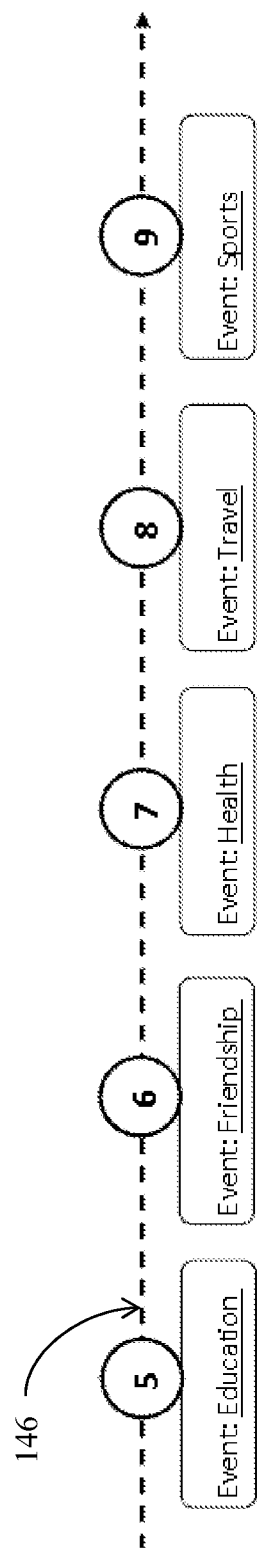
FIG. 3 is an illustration of events associated with ages, according to an embodiment.

Exemplary embodiments of the invention are described in detail below. Note that the following exemplary embodiments do not in any way limit the scope of the invention. Note also that all of the elements described in connection with the following exemplary embodiments should not necessarily be taken as essential elements of the invention.

I. Overview

In various embodiments, a method is provided for generating visual representations of a life history (e.g., a biographical lifeline).

Based on user input (e.g., via a graphical user interface via jQuery UI functionality), the system may acquire event data for creating a life history or timeline. The events may be recorded and/or organized into chronological order.

The user may input or select text that describes the event, major influences, minor influences, an age of the user at which the event occurred, whether the event was positive or negative, and/or decisions that were made that influenced the user. Examples of events may include moving from one location to another, the birth of a child, getting a job, winning an award, or the death of a loved one.

The events may be represented graphically, such as by a line segment that illustrates positive events by extending upward and negative events by extending downward. The line segments for the events may be combined by linking each of the line segments together to form a life history. The linked events may be ordered chronologically, and may include all of the events described within the user's event data. In other embodiments, selected events may be combined, such as events that relate to a particular influence, or are causally connected. The system may be programmed using a combination of javascript, jQuery and flot programming languages.

In various embodiments, the visual representation of the life history may be flattened to form a straight line (e.g., a flattened timeline) broken by circles representing events and/or ages at which events occurred. The circles may be coded with the descriptive metadata, and may represent not only the age at which the event occurred and the event itself, but also the influence factors associated with the event in the event data.

In some embodiments, two or more flattened timelines may be displayed parallel to each other to allow visualization of similarities and differences between the timelines. For example, identical events that occurred at the same age for two different users may be visualized as a solid line drawn perpendicular to the two flattened timelines. Similar events, such as events that occurred due to the same influence, or differ slightly in descriptions, may be linked by a different image, such as a dashed and/or angled line.

Parallel events, such as those that occur in two different timelines, may be marked using a solid circle. Unparalleled events, such as those that occur in one, but not another timeline, may be marked by a different symbol, such as a triangle. An example of an unparalleled event may include winning a race at a particular location at a particular time.

Embodiments of the method and system may thus be involved with collecting events of interest, arranging the collected events in chronological or other orders, automatically creating visualizations of a life history.

By electronically presenting visualized life histories and/or by visualizing comparisons between life histories, various embodiments of the system and method provide improvements over conventional systems. The visualized life histories and/or comparisons may permit a different or improved opportunity to remember and think about a person's life, and may be useful for business organizations, charities, foundations, families, biographers, and autobiographers.

II. Figure Descriptions

FIG. 1 is an illustration of a visualization of a life history, according to an embodiment. FIG. 1 includes a first visual representation 102, which is composed of a series of interconnected horizontal and vertical lines. The progression along the horizontal axis to the right of the page indicates increasing age. The vertical axis represents positive or negative events.

In an embodiment, the vertical lines and horizontal lines are based on the number of events that are shown. Although the events may have varying durations and intensities and significance for the user, each event may be displayed using the same horizontal length of a segment and the same vertical length for a segment. For example, the death of a loved one may have a downward extending line segment that has the same length as the upward length of an event relating to getting together with friends. In other words, in some embodiments, the significance of an event does not change the size or shape of the image used to represent an event, other than whether it is positive or negative. In other embodiments, the significance of an event may be proportional to the size of the visual symbol used to represent an event.

FIG. 2 is an illustration of event categories and types, according to an embodiment. FIG. 2 may be a menu that depicts types of biographical events divided into five categories along with a sixth category for undescribed types of events. The menu may assist a user by priming the user's memory to recall, categorize, and define certain events. As shown, the menu includes event categories 104 and event types 106.

Illustrated event categories 104 include: knowledge, relationships, labor, recognition, leisure, and me.

Knowledge may represent a category of events associated with changes in knowledge and understanding. Knowledge may include event types 106 such as family, education, religion, mentors, books, and self-development.

Relationships may represent a category of events associated with other people, pets, other living things, or more abstract concepts. Relationships may include event types 106 such as friendship, romance, marriage, children, grandchildren, and death.

Labor may represent a category of events associated with working, or things that affect work. Labor may include event types 106 such as health, employment, automobile, relocation, real estate, and war.

Recognition may represent a category of events associated with being recognized by other people and/or groups. Recognition may include event types 106 such as historic events, politics, membership, promotion, awards, and public speaking.

Leisure may represent a category of events associated with entertainment, amusement, or non-income generating activities. Leisure may include event types 106 such as travel, music, writing, arts, sports, and hobbies.

"Me" may represent a category of events that are associated with the individual whose life history is represented through each of the described/selected events. "Me" may include event types 106 such as unparalleled events.

In other embodiments, more, fewer, and/or different event categories and event types may be used.

In some embodiments, when a user selects event types 106 from the menu, the user may arrange the events in a flattened timeline in association with the user's age when the event occurred, as shown in the ordered events 146 of FIG. 3. From FIG. 3, the user may identify whether an event was positive or negative, which may permit the system to illustrate the event.

Figure 4:
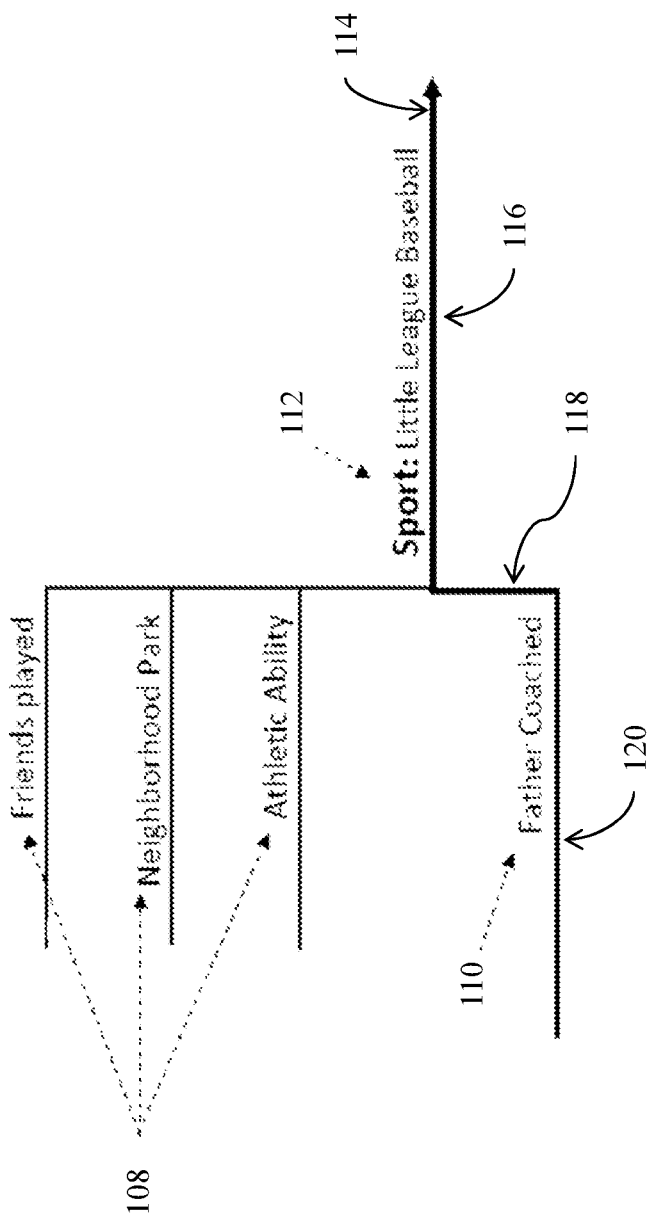
FIG. 4 is an illustration of a positive event, according to an embodiment.
Figure 5:
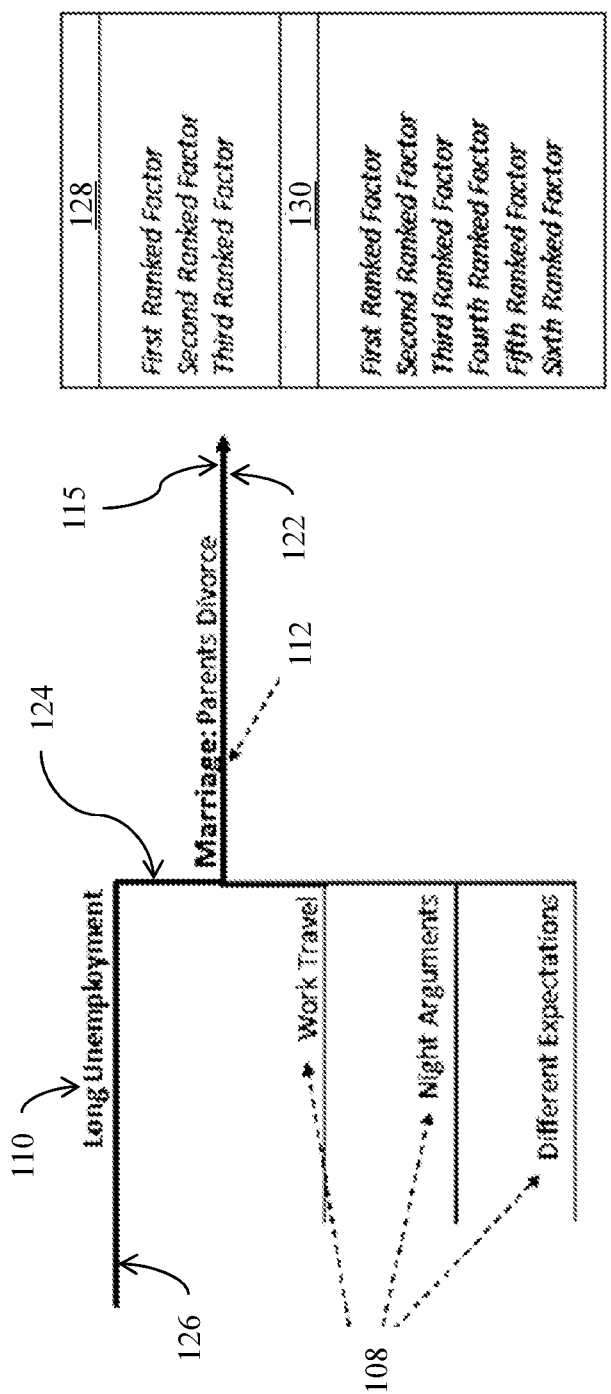
FIG. 5 is an illustration of a negative event, according to an embodiment.

FIG. 4 is an illustration of a positive event 114 (e.g., a first image), according to an embodiment, and FIG. 5 is an illustration of a negative event 115 (e.g., a second image), according to an embodiment. FIGS. 4 and 5 include minor influences 108, major influences 110, and an event description 112.

FIG. 4 further includes a first segment 116 that extends horizontally, a second segment 118 that extends vertically, and a third segment 120 that extends horizontally. The second segment 118 extends upward from the end of the third segment 120 to the beginning of the first segment 116. In some embodiments, the second segment 118 may be at the lateral beginning or lateral end of the positive event 114, and may extend upward toward a horizontal segment or upward from a horizontal segment of the positive event 114.

FIG. 5 further includes a first segment 122 that extends horizontally, a second segment 124 that extends vertically, and a third segment 126 that extends horizontally. The second segment 124 extends downward from the end of the third segment 126 to the beginning of the first segment 122. In some embodiments, the second segment 124 may be at the lateral beginning or lateral end of the negative event 115, and may extend downward toward a horizontal segment or upward from a horizontal segment of the negative event 115.

The event description 112 may include an event category 104 and/or an event type 106 that were selected from the menu of FIG. 2. For example, as shown, the event description 112 includes an event type 106 of Sport. The event description 112 may further include text entered by the user, such as "little league baseball." The user may be limited by the number of words and/or by the number of characters used to describe an event.

In some embodiments, the minor influences 108, the major influence 110, and/or the event description 112 may be limited by the total number of words, sentences, adjectives, nouns, and/or verbs used. For example, the user may be limited to a single sentence having a single noun and two adjectives. In some embodiments, the user may be limited to entering a pair of nouns, or a noun and a verb. By using a noun and a verb without other words, the description can This limitation may help focus a user on using a few key words to identify an event, which in turn may facilitate additional features of the system and method.

As shown in FIG. 5, the system may present the user with a major factor list 128 and a minor factor list 130. These lists may include a series of ranked factors (e.g., first through third ranked factors, or first through fifth or sixth ranked factors). These lists may be based on the text entries provided by the user to describe major or minor factors, and they may be automatically sorted by the system by the frequency of use. The factors (e.g., names of people, family, places, etc.) that are used the most frequently may be presented at the top of the list. The system may allow the user to select a space for text entry, and then allow the user to drag and drop or otherwise select from the major factor list 128 or the minor factor list 130.

Figure 6:
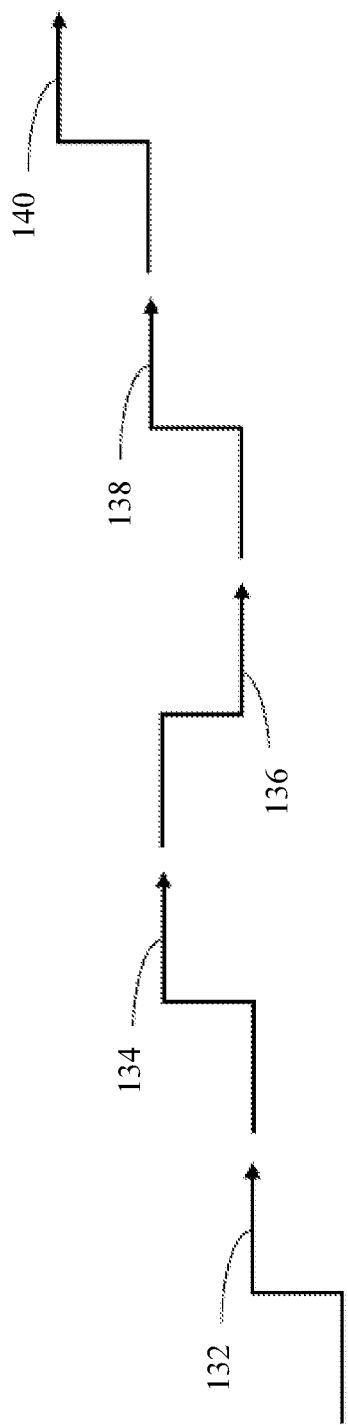
FIG. 6 is an illustration of an arrangement of events, according to an embodiment.

FIG. 6 is an illustration of an arrangement of events, according to an embodiment. FIG. 6 includes a first event 132, a second event 134, a third event 136, a fourth event 138, and a fifth event 140.

As shown in FIG. 6, the events have been arranged to form a continuous line, with the beginning of one event vertically aligned with the end of the next event. Once connected, the events may form a continuous representation of a series of events within a person's life, with positive events creating an upward trend, and negative events creating a downward trend.

In some embodiments, events may be connected in chronological order, and may include all the events described in a person's event data for their life history. In other embodiments, events may be automatically connected and displayed based on a connection between the events, such as an overlap with the same minor influence 108, major influence 110, event category 104, event type 106, event description 112, event polarity (e.g., positive or negative), event age (e.g., the age of the person at which the event occurred), event location, or other information.

Figure 7:
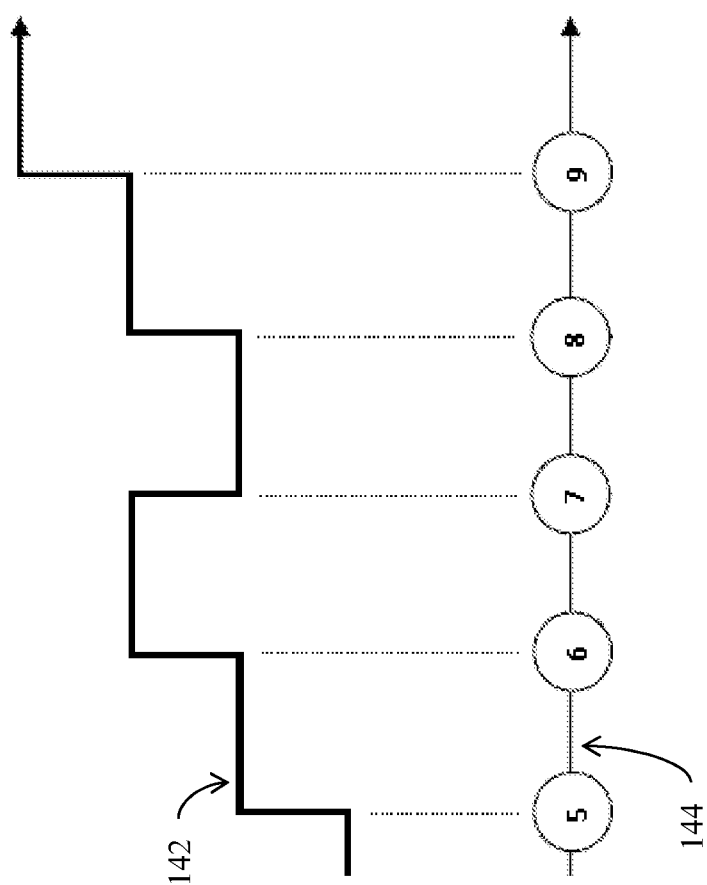
FIG. 7 is an illustration of simplifying a visualization of a life history, according to an embodiment.

FIG. 7 is an illustration of simplifying a visualization of a life history, according to an embodiment. In various embodiments, a timeline 142 (e.g., a first visual representation 102) may be simplified and/or condensed into a simplified version 144 (e.g., a condensed timeline). The simplified version 144 may remove vertical line segments from the timeline 142 and may add circles with an age representation to the simplified version 144, thus reducing vertical line complexity while adding an age and/or event indicator.

For embodiments in which multiple events are recorded for the same age (e.g., during the same year, month, day, or hour of a person's life), the timeline 142 may include multiple events that are condensed into a smaller number of segments in the simplified version 144. For example 25 events occurring during the same year may be represented as 25 different event segments in the timeline 142, but may be simplified or condensed into a single event segment in the simplified version 144.

Figure 8:
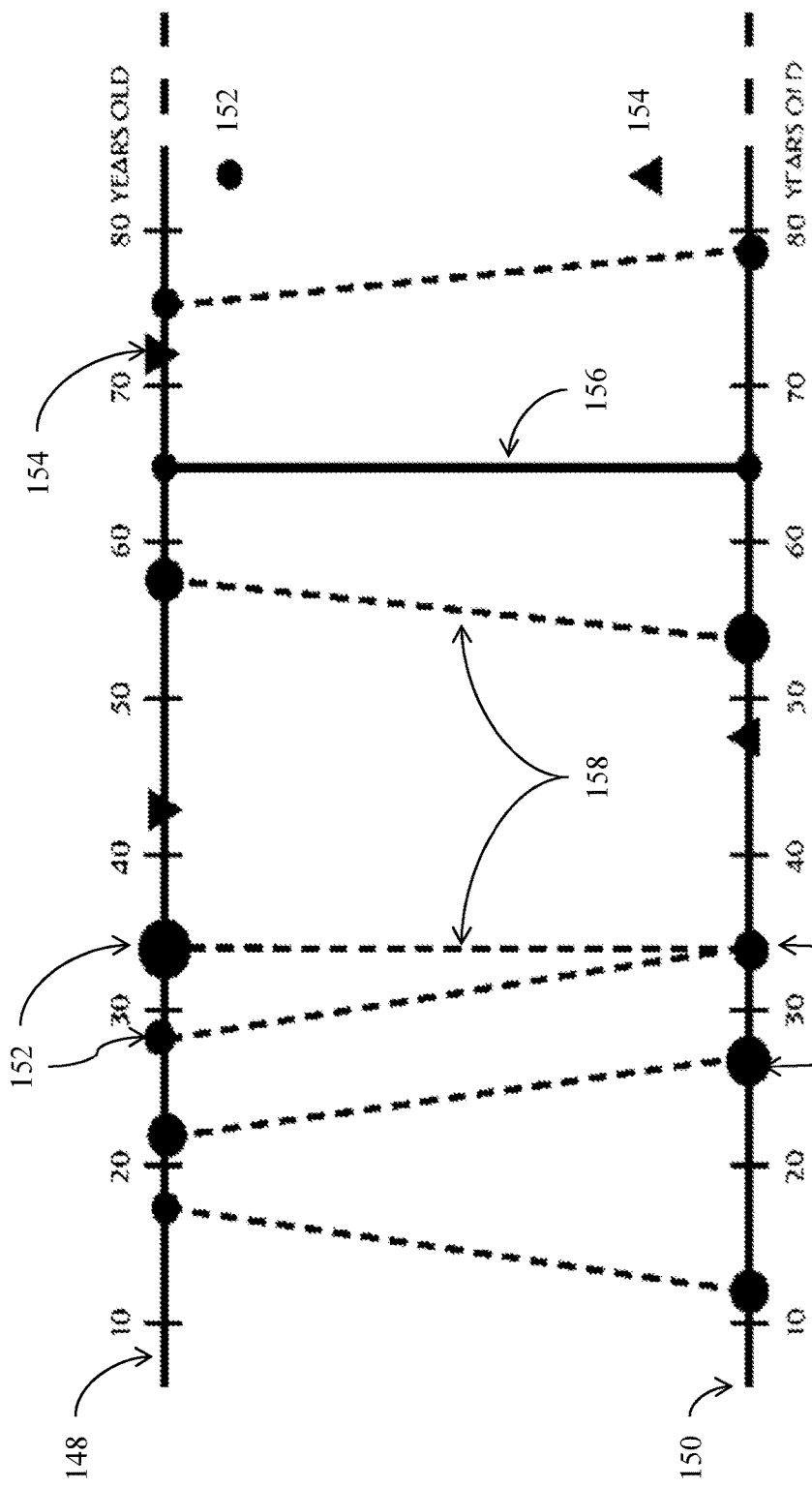
FIG. 8 is an illustration of a comparison of simplified life histories, according to an embodiment.

FIG. 8 is an illustration of a comparison of simplified life histories, according to an embodiment. FIG. 8 includes a first simplified history 148 and a second simplified history 150, a parallel event marker 152, an unparalleled event marker 154, a third image 156, and fourth images 158.

Simplified life histories may be compared to show where one life history has differences or similarities with respect to other life histories. For example, a user's life history may be compared with life histories of famous persons in history, with contemporary users, with persons of different ages, or with people located in different locations. The system may be used to identify one or more parallel matches between people with different religions, ethnicity, political beliefs, or other factors.

A parallel event may occur when the same event occurs in two different life histories. For example, two different people may have a child born at the same stage in life, or two different people may get the same type of job at the same age. For example, when comparing the life of a contemporary figure such as Barack Obama to a historical figure such as Abraham Lincoln, the age at which each person became president could be identified and compared as parallel or near parallel events. A parallel event may occur when there is a match or a similarity between events in two different life histories, and the match or similarity involves an event category 104, an event type 106, a minor influence 108, a major influence 110, an event polarity (e.g., positive or negative), and/or an event description 112.

In the embodiment as shown, parallel events that occur in both life histories are represented by a circle (e.g., a parallel event marker 152). Unparalleled events, which may not appear in other users' life histories, are represented by a triangle (e.g., an unparalleled event marker 154).

When a parallel event occurs at the same age for two different people a third image 156 (e.g., a solid line) may be drawn between the parallel event. In some embodiments, events occurring at the same age are drawn perpendicular to the two simplified life histories (148, 150).

When parallel events occur at different ages in the first simplified history 148 and the second simplified history 150, a fourth image 158 (e.g., a dashed line) may be drawn between the parallel events.

Figure 9:
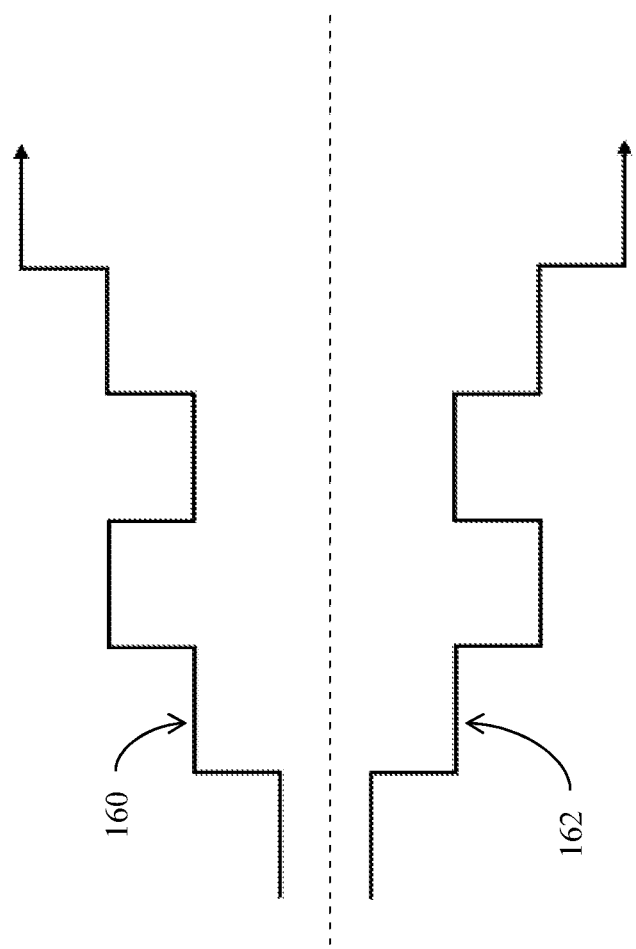
FIG. 9 is an illustration of symmetry between two life histories, according to an embodiment.

FIG. 9 is an illustration of symmetry between two life histories, according to an embodiment. As shown, FIG. 9 includes a first life history 160 and a second life history 162. Here, opposite polarity events occur in the same sequence for the first life history 160 and the second life history 162. These events may or may not have other similarities besides their sequence.

FIG. 10A-10B are illustrations of tagging events, according to an embodiment. FIG. 10A includes a first visual element 164, a second visual element 166, a first tag 168, and a second tag 170. FIG. 10B includes a combined visual element 172.

When a user wishes to indicate a visual relationship between two or more different events, the user may use a first tag 168 to identify a first visual element 164. The user may then use a second tag 170 to identify a second visual element 166. The first and second visual elements 164 and 166 may relate to two different events that are causally related (e.g., the event of the first visual event 164 caused the event of the second visual event 166, or both events were caused by the same event). The events may not occur chronologically and/or may be separated by other events. The system may ask the user for a quantity of related events, or may ask the user after each tag whether additional tags are needed.

As shown in FIG. 10B, the system may automatically combine the events to form the combined visual element 172 to form a new timeline.

Figure 11:
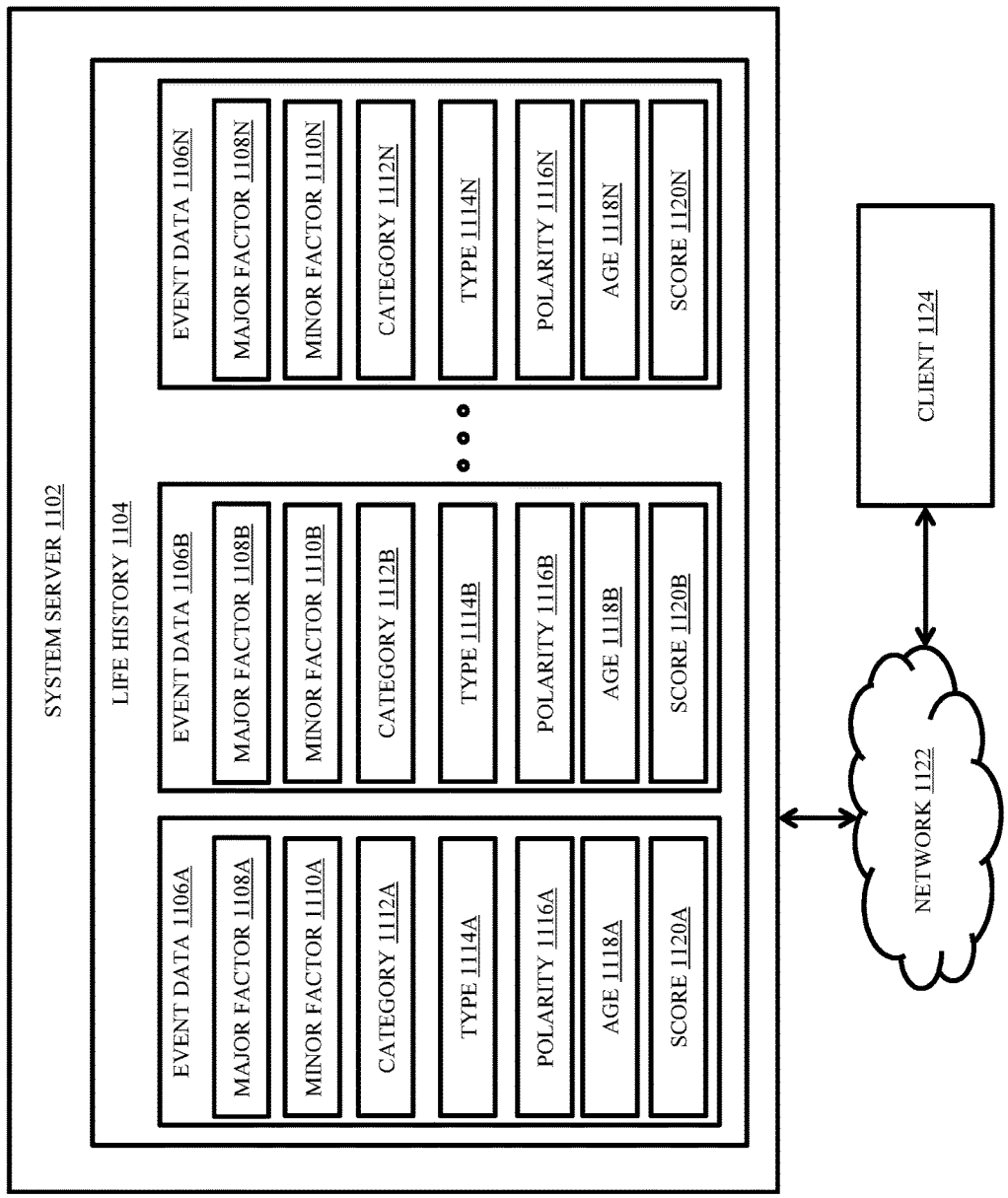
FIG. 11 is an illustration of a system server containing event data, according to an embodiment.

FIG. 11 is an illustration of a system server containing event data, according to an embodiment. FIG. 11 includes a system server 1102, a life history 1104, event data 1106A-N, major factors 1108A-N, minor factors 1110A-N, category 1112A-N, type 1114A-N, polarity 1116A-N, age 1118A-N, score 1120A-N, network 1122, and client 1124.

As shown, the system server 1102 may communicate via a network 1122 (e.g., the internet, a LAN, a WAN, etc.) with a client 1124 (e.g., a user's mobile device, computer, etc.).

The system server 1102 may contain a user's life history 1104, which may in turn include event data 1106A-N that relate to A-N events. The event data 1106A may in turn include one or more major factors 1108A and/or minor factors 1110A, event categories 1112A-N, event types 1114A-N, event polarities 1116A-N, an age 1118A-N of the user during which the event occurred, and/or a score 1120A-N that relates to how the event compares to events in another life history 1104.

Figure 12:
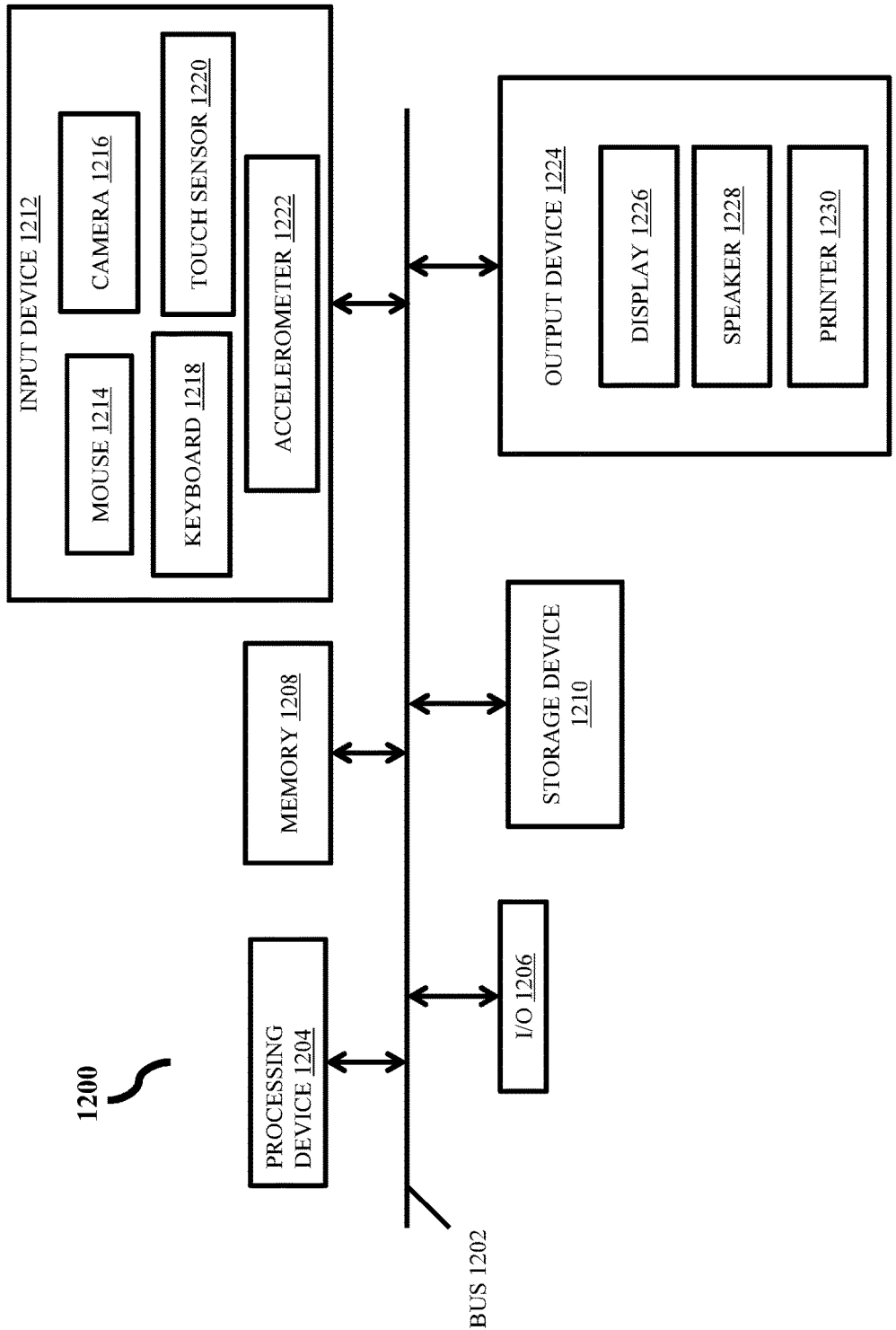
FIG. 12 is an illustration of an exemplary computing system, according to an embodiment.

FIG. 12 is an illustration of an exemplary computing system that may be used to perform the processes described herein, according to an embodiment. The computing system 1200 may include one or more of each of bus 1202, processing device 1204, I/O 1206, memory 1208, storage device 1210, input device 1212, mouse 1214, camera 1216, keyboard 1218, touch sensor 1220, accelerometer 1222, output device 1224, display 1226, speaker 1228, and printer 1230.

The processing device 1204 may include a conventional processor or microprocessor that is configured to interpret and execute a set of instructions. The processing device 1204 may communicate with each of the other components in the computing device 1200 via the bus 1202, such to obtain instructions stored in the memory 1208 and/or the storage device 1210. The processing device 1204 may further be configured to receive inputs from the input device 1202, and to provide outputs via the output device 1224. The bus 1202 may permit communication between the components of the computing device 1200.

The memory 1208 may include RAM and/or ROM. The storage device 1210 may include magnetic hard drives, flash media, magnetic media, optical media, or another type of physical device that stores information for the processing device 1204. The storage device 1210 may include tangible machine-readable media and/or the corresponding drive for reading and/or writing to the machine-readable media. The memory 1208 and/or the storage device 1210 may store a set of instructions detailing a method that when executed by one or more processing devices cause the one or more processing devices to perform the method.

The input device 1212 may be used by a user to provide information to the processing device 1204. The input device 1212 may include one or more of the mouse 1214, camera 1216, keyboard 1218, touch sensor 1220, and/or accelerometer 1222. The output device 1224 may be used by the processing device 1204 to provide audio and/or visual output to one or more users. The output device 1224 may include the display 1226, speaker 1228, and printer 1230.

The I/O 1206 may be any device that permits the processing device 1204 to communicate with other devices and/or networks. For example, the I/O 1206 may include a modem, a network card, or other interface. The I/O 1206 may permit communication with wired, wireless, and/or optical systems (e.g., Bluetooth, USB, etc.). The I/O 1206 may further permit peripheral devices to be connected to the computing device 1200, or to pair the computing device 1200 with other computing devices.

Figure 13:
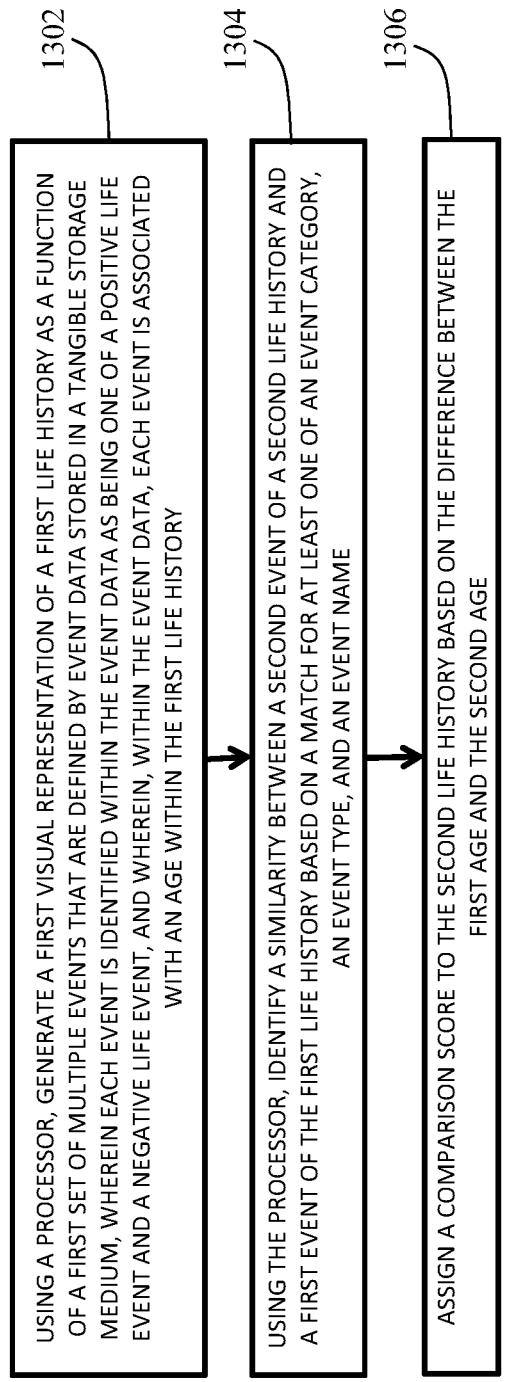
FIGS. 13, 14, and 15 are illustrations of process flows for life history visualization, according to various embodiments.
Figure 14:
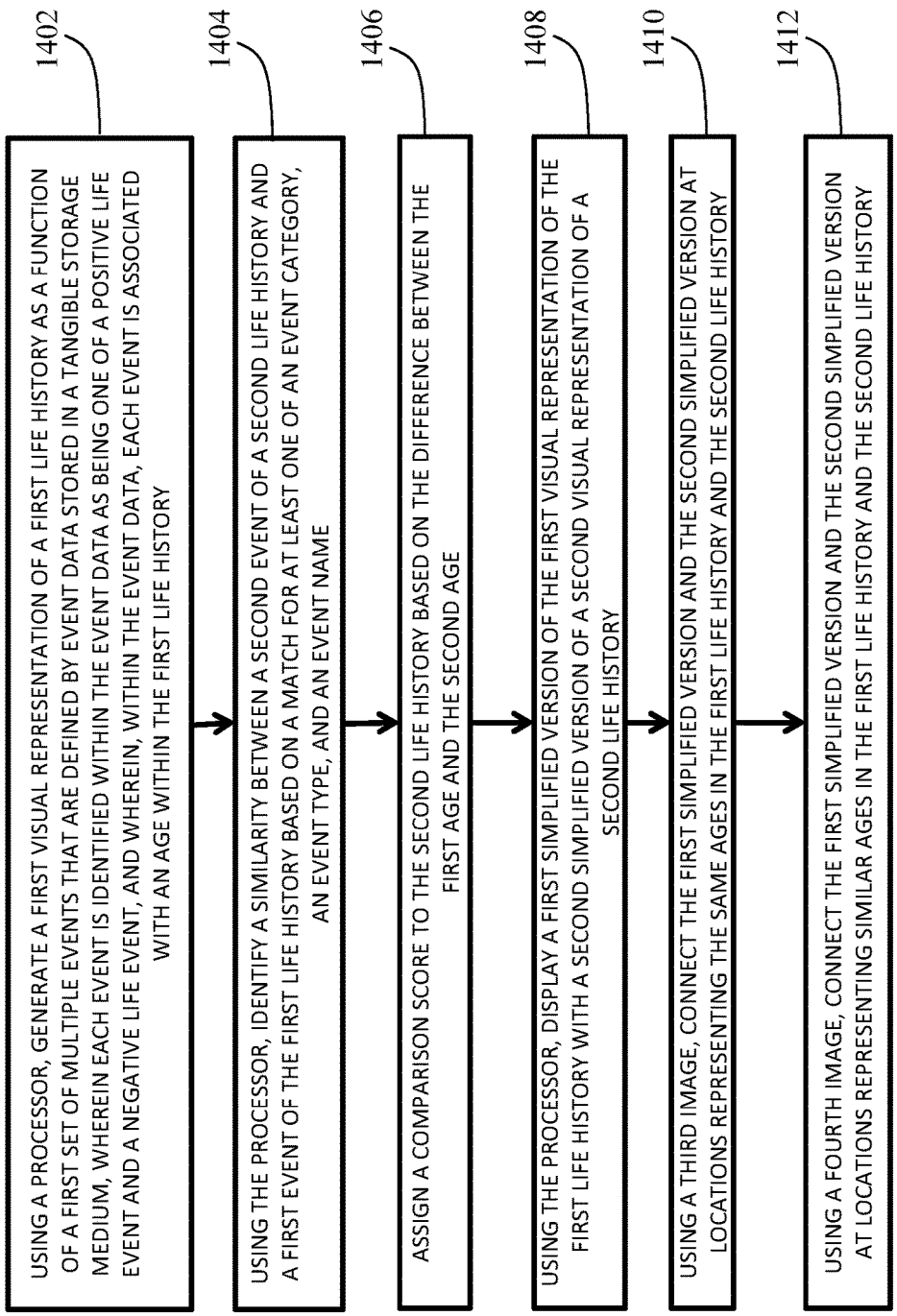
Figure 15:
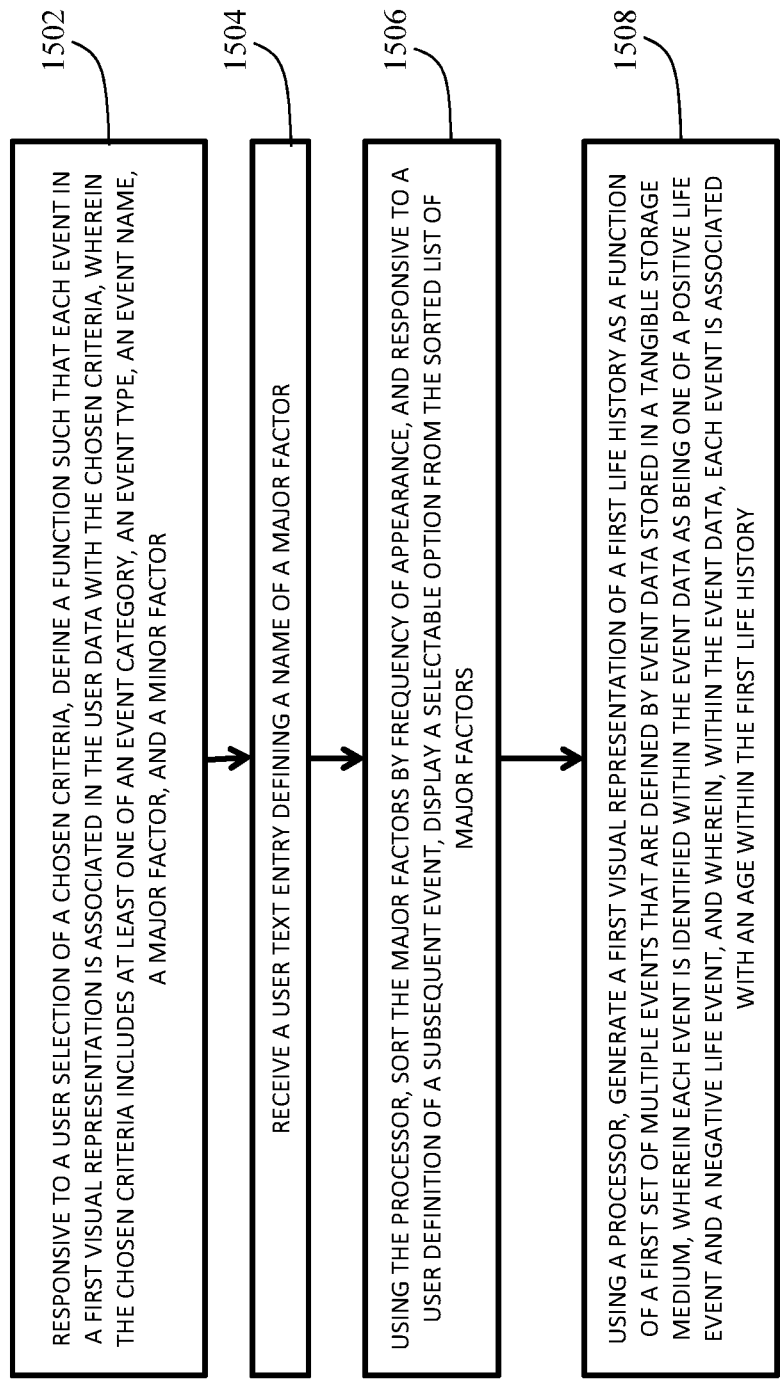

FIGS. 13, 14, and 15 are illustrations of process flows for life history visualization, according to various embodiments.

In FIG. 13, in operation 1302, the system uses a processor (e.g., the processing device 1204) to generate a first visual representation of a first life history as a function of a first set of multiple events that are defined by event data stored in a tangible storage medium, wherein each event is identified within the event data as being one of a positive life event and a negative life event, and wherein, within the event data, each event is associated with an age within the first life history.

In operation 1304, using the processor, the system identifies a similarity between a second event of a second life history and a first event of the first life history based on a match for at least one of an event category, an event type, and an event name.

In operation 1306, the system assigns a comparison score to the second life history based on the difference between the first age and the second age.

In FIG. 14, in operation 1402, the system uses a processor to generate a first visual representation of a first life history as a function of a first set of multiple events that are defined by event data stored in a tangible storage medium, wherein each event is identified within the event data as being one of a positive life event and a negative life event, and wherein, within the event data, each event is associated with an age within the first life history.

In operation 1404, the system uses the processor to identify a similarity between a second event of a second life history and a first event of the first life history based on a match for at least one of an event category, an event type, and an event name.

In operation 1406, the system assigns a comparison score to the second life history based on the difference between the first age and the second age.

In operation 1408, the system uses the processor to display a first simplified version of the first visual representation of the first life history with a second simplified version of a second visual representation of a second life history.

In operation 1410, the system uses a third image to connect the first simplified version and the second simplified version at locations representing the same ages in the first life history and the second life history.

In operation 1412, the system uses a fourth image to connect the first simplified version and the second simplified version at locations representing similar ages in the first life history and the second life history.

In FIG. 15, in operation 1502, the system, responsive to a user selection of a chosen criteria, defines a function such that each event in a first visual representation is associated in the user data with the chosen criteria, wherein the chosen criteria includes at least one of an event category, an event type, an event name, a major factor, and a minor factor.

In operation 1504, the system receives a user text entry defining a name of a major factor.

In operation 1506, the system uses the processor to sort the major factors by frequency of appearance, and responsive to a user definition of a subsequent event, displays a selectable option from the sorted list of major factors.

In operation 1508, the system uses the processor to generate a first visual representation of a first life history as a function of a first set of multiple events that are defined by event data stored in a tangible storage medium, wherein each event is identified within the event data as being one of a positive life event and a negative life event, and wherein, within the event data, each event is associated with an age within the first life history.

EXEMPLARY INSTRUCTIONS

In some embodiments, a determination of which life histories to compare may be determined by a ranking process, which may be performed in accordance with the instructions below:

```
/*************************************************
***************************
Function Name: Get_Ranking
        Inputs: User_ID_1: Unique identifier for User_1
                User_ID_2: Unique identifier for User_2
                Years: The minimum number of years required to
            get a positive ranking.
        Outputs: Ranking: A calculated score of matching Parallel
            Events between two different users
        Purpose: Given two User IDs, calculate the ranking score
of their Parallel Events. A score is given only if both users have a
Parallel Event within the specific Years of age.
**************************************************
***************************/
FUNCTION Get_Ranking (User_ID_1, User_ID_2, Number_Years)
{
   OBTAIN array of all Parallel Events for User_ID_1
   OBTAIN array of all Parallel Events for User_ID_2
   SET Ranking to 0
   FOR each Event_1 in the array of Parallel Events for User_ID_1
      FOR each Event_2 in the array of Parallel Events for
User_ID_2
         IF the event name of Event_1 is equal to the event name of
         Event_2
            SET Age_Difference to the absolute value of difference
            between age of Event_1 and Event_2
            IF Age_Difference is less than or equal to Years THEN
            {
               IF Age_Difference is equal to 0 THEN
                  ADD 1000 to Ranking
               ELSE IF Age_Difference is equal to 1
                  ADD 800 to Ranking
               ELSE
                  ADD 1000 DIVIDED by Age_Difference to Ranking
               END IF
               IF event description in Event_1 contains words of
               event description in Event_2 THEN
                  ADD 500 to Ranking
                  CALL Get_Factors_Ranking with Influence Factors
                  RETURNING Factor_Rank
                  ADD Factor_Rank to Ranking
               END IF
               IF Event_1 is positive AND Event_2 is positive THEN
                  ADD 100 to Ranking
               ELSE IF Event_1 is negative AND Event_2 is negative
               THEN
                  ADD 100 to Ranking
               END IF
            }
         END IF
      END IF
   END FOR
   END FOR
   RETURN Ranking
}
**************************************************
******************************
Function Name: Get Factors Ranking
        Inputs: Factor_1: Influence factor
                Factor_2: Influence factor
        Outputs: Ranking: A calculated score of matching influence
            factors
        Purpose: Given two Influence Factors, calculate a ranking
score of similarity. Noun-Verb relationship may be encouraged for
our customers to better understand the actions that made them who
they are.
**************************************************
***************************/
FUNCTION Get_Factors_Ranking ( Factor_1, Factor_2)
{
   SET Ranking to 0
   OBTAIN noun and verb words in Factor_1
   OBTAIN noun and verb words in Factor_2
```

```
    IF similar verbs and nouns exist in Factor_1 and Factor_2
       ADD 1000 to ranking
    ELSE IF similar verbs exist in Factor_1 and Factor_2
       ADD 500 to ranking
    ELSE IF similar nouns exist in Factor_1 and Factor_2
       ADD 200 to ranking
    END IF
    RETURN Ranking
}
```

Other exemplary instructions for the system and method according to various embodiments include the following:

```
/*************************************************************
*****************************
Function Name: Display_Biographical_Lifeline
         Inputs: User_ID: Unique identifier for the user
         Outputs: None
         Purpose: Displays the Biographical Lifeline for a
particular user by connecting each decision tree. For each tree, a line
is drawn to the right, and then up if the tree is positive, or down and
to the right if the tree is negative. The drawing pen maintains its
position while it moves through the FOR loop
**************************************************************/
FUNCTION Display_Biographical_Lifeline (User_ID)
{
    MOVE the drawing pen to the left most middle part of the page
    OBTAIN array of all Decision Trees for the given User_ID
    SORT array by age chronological order
    FOR each Tree in the array of Decision Trees
       IF the Tree is positive THEN
          Draw a green line to the right
          Draw a green line up
          Draw a green line to the right
       ELSE IF the Tree is negative
          Draw a red line to the right
          Draw a red line down
          Draw a red line to the right
       END IF
    END FOR
    Draw text Your Biographical Lifeline ™" in the top left of the page
}
/*************************************************************
********************************
Function Name: Find_And_Draw_Parallel_Match
         Inputs: User_ID: A unique identifier for the user
         Outputs: None
         Purpose: Given a particular User_ID, get the Parallel Match
ranking for everyone else in the database. If a match is found, call a
function that draws a line between Parallel Events between the user
and the user with a parallel match.
**************************************************************/
FUNCTION Find_Parallel_Match_And_Draw (User_ID)
{
    SET Best_Ranking to 0
    SET Best_Match_ID to 0
    OBTAIN an array of all ID's in the database that are not the
       User_ID
    FOR each Potential_Match_ID in array of all other users
    {
       CALL Get_Ranking with User_Id and
       Potential_Match_ID RETURNING Temp_Ranking
       IF Temp_Ranking is greater than Best_Ranking THEN
          SET Best_Ranking to Temp_Ranking
          SET Best_Match_ID to Potential_Match
       END IF
    }
    END FOR
    CALL Draw_Parallel_Match with User_ID and Best_Match_ID
}
/*************************************************************
*************************
Function Name: Get_Ranking
         Inputs: User_ID_1: Unique identifier for User_1
                 User_ID_2: Unique identifier for User_2
         Outputs: Ranking: A calculated score of matching
         Parallel Events between two different users
         Purpose: Given two User Id's, calculate the ranking score
of their Parallel Events. A score is given only if both users have a
parallel Event within 3 years older or younger of age.
**************************************************************/
FUNCTION Get_Ranking (User_ID_1, User_ID_2)
{
    OBTAIN array of all Parallel Events for User_ID_1
    OBTAIN array of all Parallel Events for User_ID_2
    SET Ranking to 0
    FOR each Event_1 in the array of Parallel Events for User_ID_1
       FOR each Event_2 in the array of Parallel Events for User_ID_2
          IF the event name of Event_1 is equal to the event name of
             Event_2
             SET Age_Difference to the absolute value of difference
                between age of Event_1 and Event_2
             IF Age_Difference is less than 4 THEN
             {
                IF Age_Difference is equal to 3 THEN
                   ADD 100 to Ranking
                ELSE IF Age_Difference is equal to 2
                   ADD 300 to Ranking
                ELSE IF Age_Difference is equal to 1
                   ADD 500 to Ranking
                ELSE IF Age_Difference is equal to 0
                   ADD 700 to Ranking
                END IF
                IF event description in Event_1 contains words of event
                   description in Event_2 THEN
                   ADD 500 to Ranking
                   IF Influence Factor of Event_1 contains words of
                      Influence Factor in Event_2 THEN
                      ADD 700 to Ranking
                   END IF
                END IF
                IF Event_1 is positive AND Event_2 is positive THEN
                   ADD 100 to Ranking
                ELSE IF Event_1 is negative AND Event_2 is negative
                   THEN
                   ADD 100 to Ranking
                END IF
             }
          END IF
       END FOR
    END FOR
    RETURN Ranking
}
/*************************************************************
*****************************
Function Name: Draw_Parallel_Match
         Inputs: User_ID_1: Unique identifier for User_1
                 User_ID_2: Unique identifier for User_2
         Outputs: None
         Purpose: Given two different unique identifiers, draw a
visual representation of the Parallel Matches between the two users.
The line drawn between the two users will be vertical if they have
Parallel Events at the same age.
**************************************************************/
FUNCTION Draw_Parallel_Match (User_ID_1, User_ID_2)
{
    Draw the name of User_ID_1 at the top of the page
    Draw a long horizontal line near the top of page
    Draw the name of User_ID_2 at the bottom of the page
    Draw a long horizontal line near the bottom of page
    Draw tick marks and the ages on both lines to portray timeline
    OBTAIN array of all Parallel Events for User_ID_1
    OBTAIN array of all Parallel Events for User_ID_2
    FOR each Event_1 in the array of Parallel Events for User_ID_1
    {
       FOR each Event_2 in the array of Parallel Events for User_ID_2
          IF Event_1 name is equal to Event_2 name THEN
             OBTAIN the predefined color for name of event
             Draw the name and color of this event to the Legend on the
                right side of the page
             Draw a circle for age of Event_1 in the top horizontal line
             Draw a circle for age of Event_2 in the bottom horizontal
                line
```

-continued

```
        Draw a dashed line to connect the two the ages with color
        of the event
    END IF
    END FOR
}
END FOR
```

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

In addition, although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A method of electronically visualizing a life history comparison, the method comprising:

using a processor, storing in a tangible storage medium, event data relating to a first life history, including a first set of multiple events each having event data associated therewith, wherein event data of the first set of events each include an event title and one of a positive predetermined visual indicator of the event being a positive life event or a negative predetermined visual indicator of a negative life event;

using the processor, storing in the tangible storage medium, event data relating to a second life history, including a second set of multiple events each having event data associated therewith, which event data of the second set of events include an event title and one of the positive or negative predetermined visual indicators;

using the processor, generating a first visual representation of the first life history as a function of the first set of multiple events that are defined by the event data stored in the tangible storage medium, and a second visual representation of the second life history as a function of the second set of multiple events that are defined by the event data stored in the tangible storage medium, and wherein, within the event data, each event in the first set is associated with an age within the first life history, and each event in the second set is associated with an age within the second life history, wherein there is also a step of using a display, the processor displays the first visual representation showing each said life event as a predetermined visual element corresponding to one of the positive or negative predetermined visual indicators for each event the life events of the first set of events, wherein the first visual representation is generated by attaching each one of the positive or negative predetermined visual indicators of the first visual representation to a first horizontal segment at a point on the first horizontal segment corresponding to the age associated therewith to form part of a first larger image which includes the first horizontal segment and the first visual representation, wherein the second image is composed of a second horizontal segment, and wherein the processor displays the second visual representation showing each said life event of the first set of events as one of the positive or negative predetermined visual indicators for each event the life events of the second set of events, wherein the second visual representation is generated by attaching each one of the positive or negative predetermined visual indicators of the second visual representation to the second horizontal segment at a point on the second horizontal segment corresponding to the age associated therewith to form part of a second larger image which includes the second horizontal segment and the second visual representation, and wherein the processor determines which life events in each of the first and second visual representations correspond to each other in response to the processor comparing the event data of the first and second life events, and displays a line connecting any such corresponding events on the first horizontal line and the second horizontal line by means of a line transverse to the first and second horizontal lines, wherein the processor determines corresponding events by identifying a similarity between a second event of the second life history and a first event of the first life history based on a match for at least one of an event category, an event type, and an event name.

2. The method of claim 1, wherein each event is associated with a major factor in the event data.

3. The method of claim 1, wherein the similarity is further identified as a function of a first age when the first event occurred in the first life history and a second age when the second event occurred in the second life history.

4. The method of claim 3, further comprising a step of:

using the processor, assigning a comparison score to the second life history based on the difference between the first age and the second age of each said match, wherein a match occurs when the first and second events are the same, and wherein the greater the age difference, the lesser the score, and wherein depending on a match of event title, event description and event type, a different predetermined score is assigned, and all scores for all events are summed to determine a comparison score.

5. The method of claim 1, further comprising:

responsive to a user selection of a chosen criteria, defining the function such that each event in the first and second visual representations is associated in the user data with the chosen criteria, wherein the chosen criteria includes at least one of an event category, an event type, an event name, a major factor, and a minor factor.

6. The method of claim 1, further comprising:

receiving a user text entry defining a name of a major factor;

using the processor, sorting the major factors by frequency of appearance;

responsive to a user identification of a subsequent event, displaying a selectable option from the sorted list of major factors.

7. A method of electronically visualizing a life history, the method comprising:

(i) using a processor, storing in a tangible storage medium, event data relating to a life history, including a set of multiple events each having event data associated therewith, wherein event data of the set of events each include an event title and one of a positive predetermined visual indicator of the event being a positive life event or a negative predetermined visual indicator of a negative life event;

(ii) using the processor, generating a visual representation of the life history as a function of the set of multiple events that are defined by the event data stored in the tangible storage medium, (iii) wherein, within the event data, each event in the set of multiple events is associated with an age within the life history, (iv) wherein there is also a step of using a display, the processor displays the visual representation showing each said life event as a predetermined visual element corresponding to one of the positive or negative predetermined visual indicators for each event the life events of the set of events, wherein the visual representation is generated by attaching each one of the positive or negative predetermined visual indicators of the visual representation to an associated horizontal segment at a point on the horizontal segment corresponding to the age associated therewith to form part of a larger image which includes the first horizontal segment and the visual representation, and (v) wherein the processor generates and shows on the display a vertical segment extending upward a predetermined amount for each positive life event and downward the predetermined amount for a negative life event from a point of the age at which such life event occurred along the horizontal segment, (vi) wherein the processor generates a next associated horizontal segment extending from an end of the vertical segment, until a next positive or negative life event where there is a next vertical segment extending upward the predetermined amount if such life event is a positive life event and downward the predetermined amount if such life event is a negative life event from a point of the life event on said next associated horizontal segment, wherein the processor repeats the steps (v) and (vi) until the set of multiple events in the life history are displayed.

8. The method of claim 7, wherein in the step (i) of storing event data, a particular event may be stored in association with a positive predetermined visual indicator of the event being a positive life event and in association with a first age, and the same particular event may be stored in association with a negative predetermined visual indicator of the event being a negative life event at a second age on the life history.

* * * * *